(12) United States Patent
Kwon

(10) Patent No.: US 7,110,857 B2
(45) Date of Patent: Sep. 19, 2006

(54) METHOD FOR LEAVING AN EMPTY PITCH IN A VEHICLE CONVEYER LINE

(75) Inventor: Dong Bok Kwon, Ulsan (KR)

(73) Assignee: Hyundai Motor Company, Seoul (KR)

( * ) Notice: Subject to any disclaimer, the term of this patent is extended or adjusted under 35 U.S.C. 154(b) by 254 days.

(21) Appl. No.: 10/886,495

(22) Filed: Jul. 7, 2004

(65) Prior Publication Data

US 2005/0006203 A1   Jan. 13, 2005

(30) Foreign Application Priority Data

Jul. 7, 2003  (KR) ...................... 10-2003-0045735

(51) Int. Cl.
*G06F 7/00* (2006.01)

(52) U.S. Cl. .................... 700/230; 198/460.1; 198/437

(58) Field of Classification Search ................ 700/213, 700/228, 229, 230, 112; 198/437, 460.1
See application file for complete search history.

(56) References Cited

U.S. PATENT DOCUMENTS 6,061,887 A * 5/2000 Kawasaki et al. ....... 29/407.01

FOREIGN PATENT DOCUMENTS

JP         08-197389         6/1996

* cited by examiner

*Primary Examiner*—Khoi H. Tran
(74) *Attorney, Agent, or Firm*—Morgan Lewis & Bockius LLP

(57) ABSTRACT

The method for leaving an empty pitch in a line of vehicles entering a trim line range of a trim shop conforms with operating and production restriction conditions of the trim shop. The method determines an empty pitch pattern for vehicles sent into the trim shop from a PBS through a vehicle conveyer line according to a basic empty pitch leaving scheme, and loads vehicles according to the determined empty pitch pattern, thereby increasing efficiency of line management of the trim shop and equalization of work in the trim shop.

10 Claims, 6 Drawing Sheets

FIG.4

| Pattern number | Priority order | Empty pitch pattern and item number (Direction of flow of vehicles →) | Pseudo pattern (Direction of flow of vehicles →) | Basic scheme |
|---|---|---|---|---|
| 1 | 1 | ⑨ 8 7 6 ⑤ 4 3 2 ① | □ □ □ □ □ | Front and rear pitches empty |
| 2 | 2 | ⑤ 4 3 2 ① | □ □ □ | ← |
| 3 | 3 | 3 ② 1 | □ □ □ | Intermediate pitch empty |
| 4 | 4 | ③ 2 1 | □ □ □ | Rear pitch empty |
| 5 | 5 | 4 3 2 ① | □ □ □ | Front pitch empty |

Legend: □ Corresponding vehicle   ○ Empty pitch

METHOD FOR LEAVING AN EMPTY PITCH IN A VEHICLE CONVEYER LINE

CROSS-REFERENCE TO RELATED APPLICATIONS

This application claims priority to Korean Application No. 10-2003-0045735 filed on Jul. 7, 2003, the disclosure of which is incorporated fully herein by reference.

FIELD OF THE INVENTION

The present invention relates to a method for leaving a gap or empty pitch in a vehicle conveyer line.

BACKGROUND OF THE INVENTION

Specific kinds of vehicles are often transferred to a trim shop of a vehicle body conveyer line. As the processes within the trim shop take an excessive amount of time, a space is typically left either within, before, or after a line of vehicles on the conveyor line to account for this excessive time. This space is known as an empty pitch.

In order for an automobile company to produce a completed vehicle, various processes, from a selection of material to assembly of the vehicle, are needed. Furthermore, various efforts to increase productivity through factory automation and efficient use of facilities are continuously being made. In order to facilitate increased productivity, automobile companies ascertain stock management and production sequence data by determining production schedules according to consumers' vehicle purchase orders.

This production sequence data is then used to send vehicles that have been painted in a paint shop, and stored in painted body storage (PBS), to a trim shop, where various components are coupled to the vehicle body. That is, the painted vehicles are stored in the PBS until they are required by the trim shop, as based on the trim shop's work load, according to commands of a PBS controller.

However, if specific types of vehicles are continuously required by the trim shop, work time in a specific process may substantially increase, thereby causes a stoppage of the production line. In order to prevent such stoppage, when specific type's of vehicles are continuously input into the trim line, an empty pitch P (i.e., an empty seat) is left within a line of vehicles, before a line of vehicles, or after a line of vehicles.

Typically, if a PBS operator notices many vehicles being transferred to the trim shop, the PBS operator informs a worker of the same, via a wire communication, and the worker inputs an order into a trim line controller to insert an empty pitch whenever a corresponding vehicle is transferred to the trim shop. However, if the worker erroneously omits to input the order for leaving an empty pitch, a possibility of a production line stoppage still exists. Accordingly, it is difficult to effectively perform line management of the trim shop and maintain work equalization in the trim shop.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

An embodiment of the present invention provides a method for leaving an empty pitch in a vehicle conveyer line, either within, before or after a line of vehicles entering a trim line of a trim shop. The empty pitch is left in the conveyor line in conformity with the operating and production restriction conditions of the trim shop. An embodiment of the present invention provides a method for leaving an empty pitch that determines an empty pitch pattern for vehicles loaded into the trim shop from a PBS through a vehicle conveyer line, according to a basic empty pitch leaving scheme. The method then loads vehicles according to the determined empty pitch pattern, thereby increasing efficiency of line management of the trim shop and equalizing work load within the trim shop.

In some embodiments, the method for leaving an empty pitch in a vehicle conveyor line includes calculating an empty pitch pattern for leaving an empty pitch in a line of vehicles taken into a trim line range of a trim shop from painted body storage (PBS) via a conveyer line range. The calculation takes into account the operating and production restriction conditions of the trim shop. Related data of the empty pitch pattern for vehicles entering the conveyer line range and the trim line range is then and initialized. Vehicle entrance information of a vehicle having entered the conveyer line range and the trim line range is subsequently renewed, if a new vehicle is taken into the trim line range. It is then determined whether there is a currently applied empty pitch pattern for the vehicle having entered the trim line range. A trim line controller is then instructed to: (i) leave an empty pitch, if a sequential number of a vehicle entering the trim line range is equal to an individual item number DNO2 for leaving an empty pitch in the corresponding empty pitch pattern, (ii) add "1" to the individual item number DNO2. It is then determined whether a value of the individual item number is greater than a number of total items of the corresponding empty pitch pattern. It is determined whether a number of an empty pitch pattern whose vehicle sequence of a corresponding pseudo pattern is equal to vehicle sequence of vehicles before entering the trim line range. A priority order of the determined empty pitch pattern is also determined, and then returned to instructing the trim line controller.

IN some embodiments, the empty pitch pattern includes an empty pitch left in a line of vehicles according to a basic empty pitch leaving scheme comprising leaving front, rear, front and rear, or intermediate pitches empty, and wherein a sequence of the empty pitch and the vehicle is described as an item number.

In some embodiments, the related data of the empty pitch pattern includes a pattern number of an empty pitch pattern for vehicles respectively entering the conveyer line range and the trim line range, and an individual item number that is recorded according to a vehicle insertion sequence including an empty pitch. Also in some embodiments, the pseudo pattern is obtained by eliminating an empty pitch from the empty pitch pattern.

The determination of an empty pitch pattern and initializing related data includes determining an empty pitch pattern for leaving an empty pitch within a line of vehicles entering the trim line range of the trim shop from the PBS according to a basic empty pitch leaving scheme in conformity with the operating and production restriction conditions of the trim shop as pattern numbers, and registering the determined empty pitch pattern. A value of a pattern number of the empty pitch pattern is initialized for vehicles entering the conveyer line range and the trim line range and a value of the individual item number that is recorded according to an insertion sequence of vehicles and the empty pitch.

In some embodiments the renewing and the determining include determining whether a detection signal indicating entrance of a new vehicle from the conveyer line range to the trim line range is input from a vehicle detection sensor. The method then ends, if it is determined that the detection signal is not input. Vehicle entrance information is renewed for vehicles entering the conveyer line range and the trim line range if it is determined that the detection signal is input and simultaneously chasing a pattern number corresponding to the empty pitch pattern including empty pitches in a line of vehicles according to the basic empty pitch leaving scheme; and determining whether there is a currently applied empty pitch pattern for the vehicles having entered the trim line range.

In some embodiments, if it is determined that there is a currently applied empty pitch pattern, then it is determined whether an order of a new vehicle entering the trim line range corresponds to an item number DNO2 for leaving an empty pitch in the corresponding empty pitch pattern PNO2. An instruction for leaving an empty pitch to a trim line controller is then output, if it is determined that the order of the new vehicle corresponds to the item number DNO2 for leaving the empty pitch in the empty pitch pattern PNO2. "1" is then added to the item number DNO2 of the applied empty pitch pattern, and it is determined whether a value of the item number is less than a number of all items of the corresponding empty pitch pattern. The method ends, if the item number is less than the number of all items of the corresponding empty pitch pattern, and the method returns to renewing and determining after resetting, if the item number is not less than the number of all items of the corresponding empty pitch pattern. Still further, a pattern number of the empty pitch pattern for vehicles entering the trim line range and the item number in the empty pitch pattern for vehicles entering the trim line range is reset.

In some embodiments, if it is determined that there is no currently applied empty pitch pattern, then it is determined whether there is a corresponding empty pitch pattern whose registered pseudo pattern coincides with a sequence of vehicles before entering the trim line range. Then, a number of the empty pitch pattern whose pseudo pattern coincides with the sequence of vehicles before entering the trim line range, is determined. The empty pitch leaving number of the empty pitch pattern is then set, including the new vehicle entering the trim line range as a corresponding pattern number of the empty pitch pattern whose registered pseudo pattern coincides with the sequence of vehicles before entering the trim line range, if the number of the empty pitch pattern whose pseudo pattern coincides with the sequence of vehicles before entering the trim line range. A priority of the corresponding empty pitch patterns is then determined, if the number of the empty pitch pattern whose registered pseudo pattern coincides with the sequence of vehicles before entering the trim line range is more than 1. The empty pitch pattern number PNO2 is then set as a pattern number having a higher priority, the item number DNO2 of the new vehicle in the corresponding empty pitch pattern is set as "1," and the method returns to instructing a trim line controller to leave an empty pitch.

In another embodiment of the present invention, an empty pitch leaving method for a vehicle conveyer line includes determining an empty pitch pattern for leaving an empty pitch within a line of vehicles entering a trim line range of a trim shop from painted body storage (PBS), according to a basic empty pitch leaving scheme, in conformity with an operating and production restriction conditions of the trim shop as pattern numbers. The determined empty pitch pattern is then registered. A value of a pattern number of the empty pitch pattern for vehicles entering the conveyer line range and the trim line range and a value of the individual item number that are recorded according to an insertion sequence of vehicles and the leaving of the empty pitch are initialized. It is then determined whether a detection signal indicating entrance of a new vehicle from the conveyer line range to the trim line range is input from a vehicle detection sensor. The method ends if it is determined that the detection signal is not input. If it is determined that the detection signal is input and simultaneously chasing a pattern number corresponding to the empty pitch pattern including empty pitches in a line of vehicles according to the basic empty pitch leaving scheme. Then vehicle entrance information is renewed for vehicles entering the conveyer line range and the trim line range. It is then determined whether there is a currently applied empty pitch pattern for the vehicles having entered the trim line range. If it is determined that there is a currently applied empty pitch pattern, then it is determined whether an order of a new vehicle entering the trim line range corresponds to an item number DNO2 for leaving an empty pitch in the corresponding empty pitch pattern PNO2. If it is determined that the order of the new vehicle corresponds to the item number DNO2 for leaving the empty pitch in the empty pitch pattern PNO2, then an instruction for leaving an empty pitch to a trim line controller is output. "1" is added to the item number DNO2 of the applied empty pitch pattern, and it is determined whether a value of the item number is less than a number of all items of the corresponding empty pitch pattern. The method ends, if the item number is less than the number of all items of the corresponding empty pitch pattern. If the item number is not less than the number of all items of the corresponding empty pitch pattern, then the method returns to renewing and determining after resetting. If it is determined that there is no currently applied empty pitch pattern, then it is determined whether there is a corresponding empty pitch pattern whose registered pseudo pattern coincides with a sequence of vehicles before entering the trim line range. It is also determined whether a number of the empty pitch pattern whose pseudo pattern coincides with the sequence of vehicles before entering the trim line range. If the number of the empty pitch pattern whose pseudo pattern coincides with the sequence of vehicles before entering the trim line range, then the number of the empty pitch of the empty pitch pattern including the new vehicle entering the trim line range is set as a corresponding pattern number of the empty pitch pattern whose registered pseudo pattern coincides with the sequence of vehicles before entering the trim line range. If the number of the empty pitch pattern whose registered pseudo pattern coincides with the sequence of vehicles before entering the trim line range is more than 1, then a priority of the corresponding empty pitch patterns is determined. The empty pitch pattern number PNO2 is set as a pattern number having a higher priority, and the item number DNO2 of the new vehicle in the corresponding empty pitch pattern is set as "1." The method then returns to the instructing a trim line controller to leave an empty pitch.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein:

FIG. 4 is a table showing pattern schemes and pseudo patterns that are used in the method for leaving an empty pitch according to the embodiment of the present invention;

DETAILED DESCRIPTION OF THE PREFERRED EMBODIMENTS

Hereinafter, some embodiments of the present invention will be described in detail with reference to the accompanying drawings.

Figure 1:
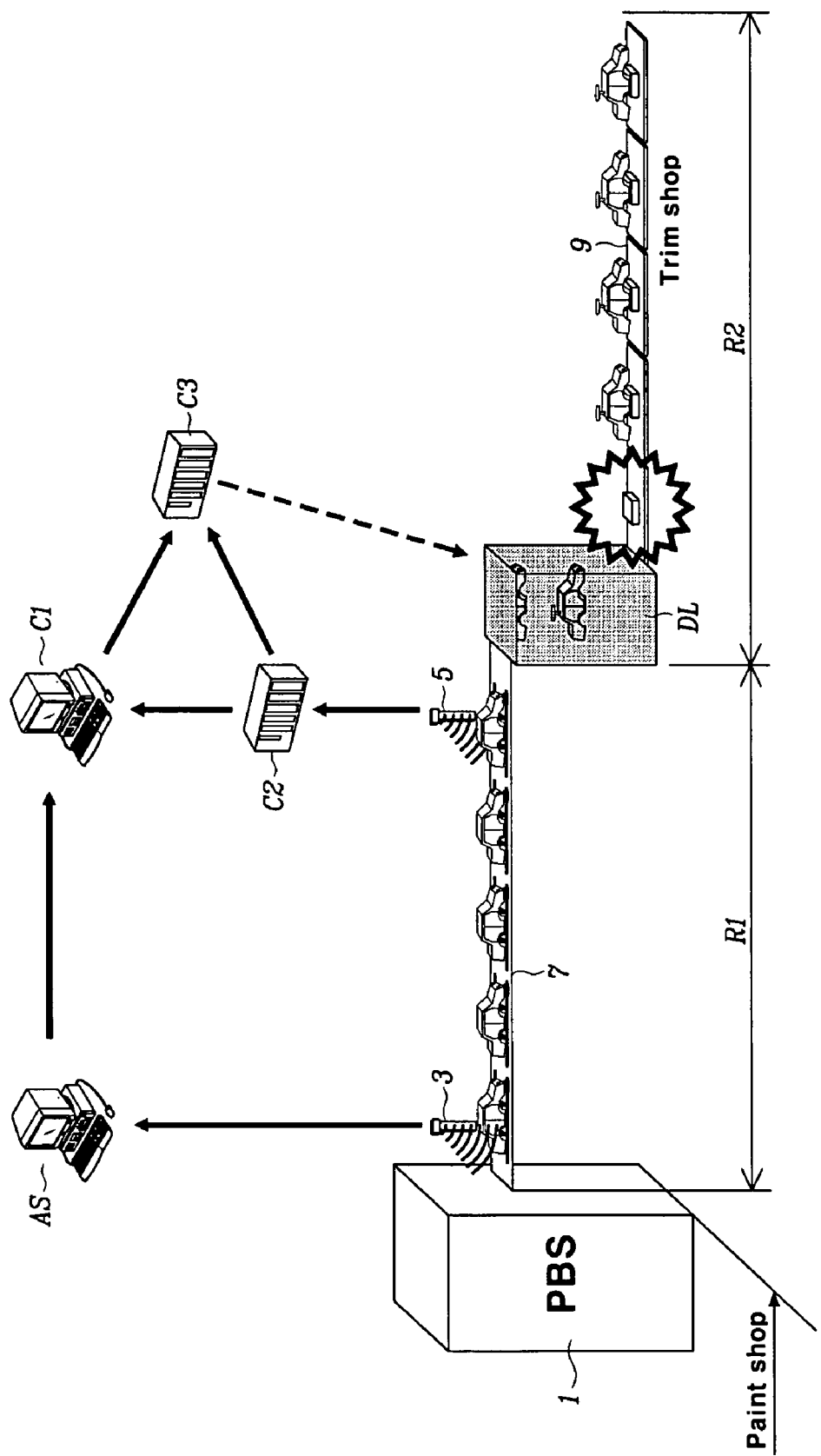
FIG. 1 is a control diagram of a system for controlling loading of a vehicle onto a conveyer line and controlling a trim line for conveying vehicles to a trim shop from a PBS for storing painted bodies to which the present invention can be applied.
Figure 2:
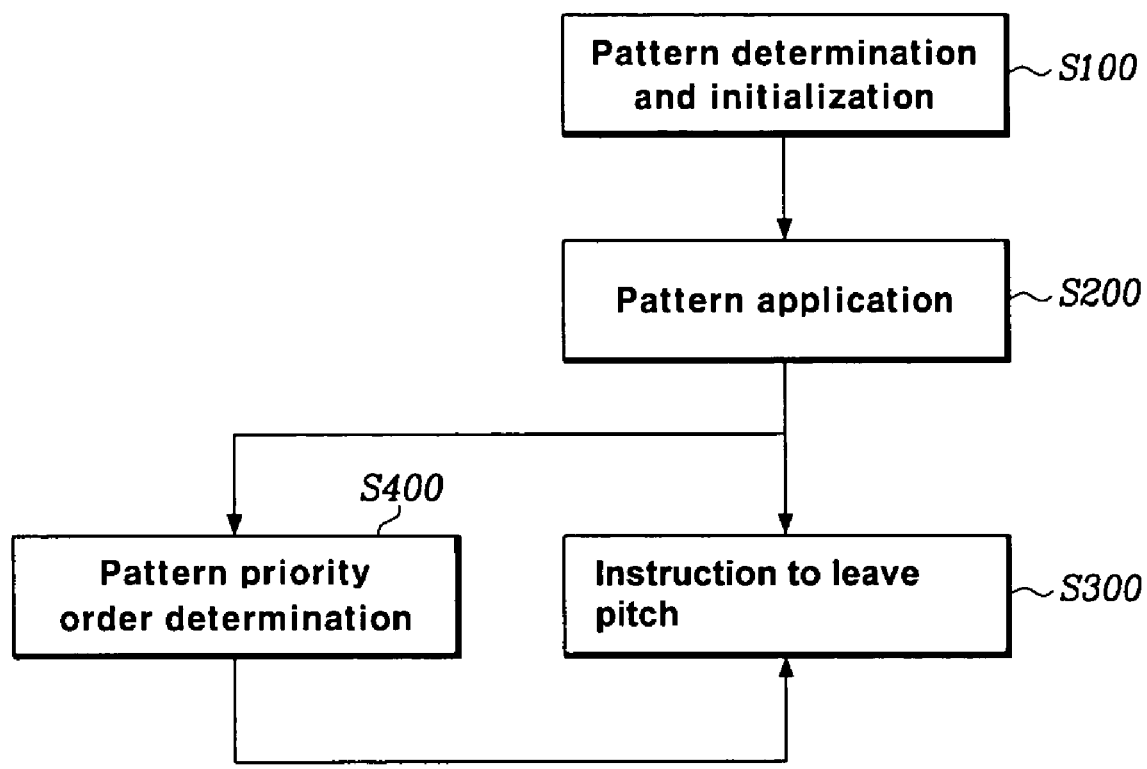
FIG. 2 is a block diagram of a method for leaving an empty pitch in a vehicle conveyer line according to an embodiment of the present invention.
Figure 3:
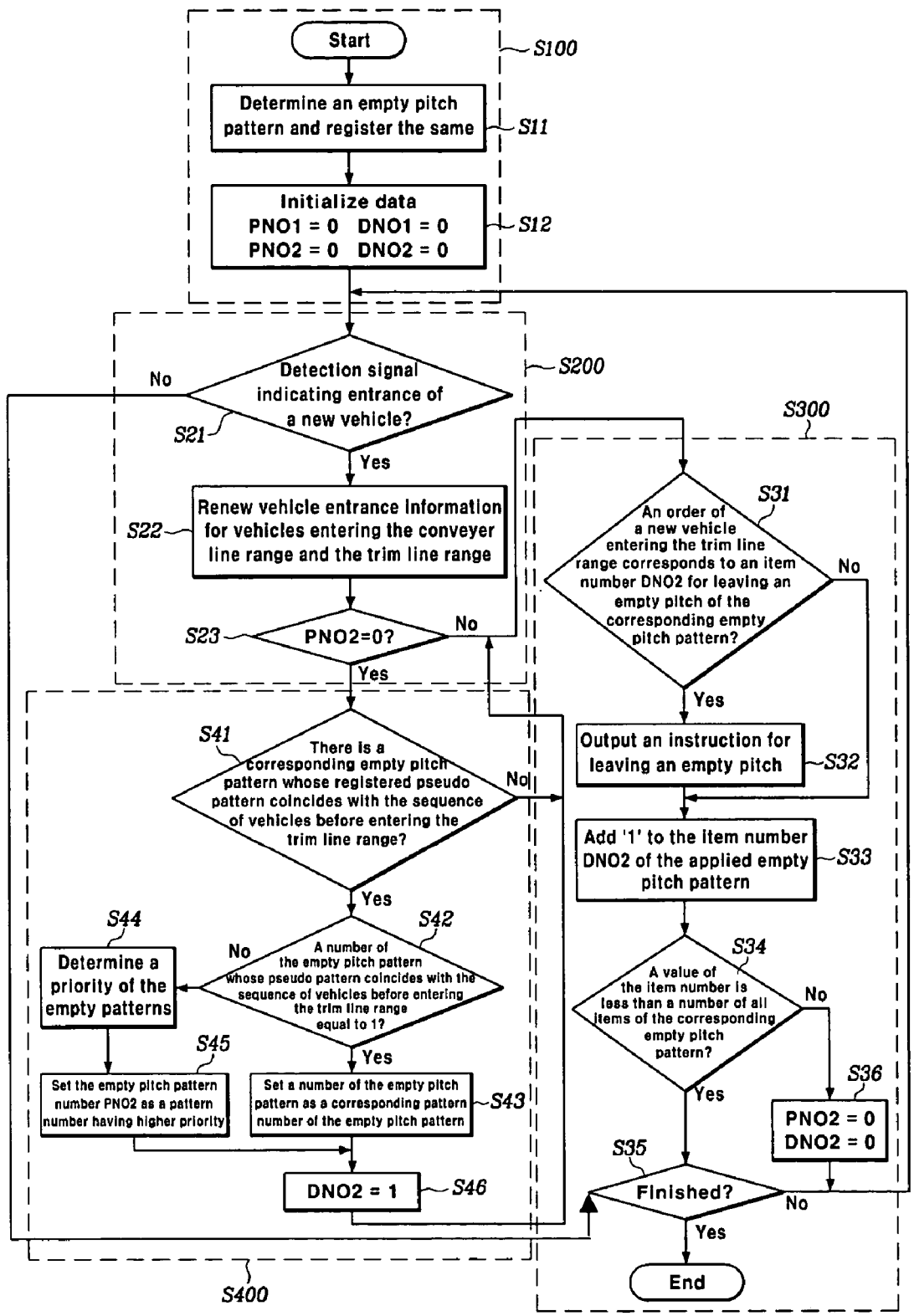
FIG. 3 is a flow chart of a method for leaving an empty pitch leaving in a vehicle conveyer line according to an embodiment of the present invention.

FIG. 1 is a block diagram of a system for controlling vehicle input into a trim shop from painted body storage (PBS) to which a present invention may be applied. FIG. 2 is a block diagram showing a method for leaving an empty pitch in a vehicle conveyer line according to an embodiment of the present invention. FIG. 3 is a flow chart of a method for leaving an empty pitch in a vehicle conveyer line according to an embodiment of the present invention.

A vehicle that has been painted in a paint shop is stored in painted body storage (PBS) 1. The vehicle that is stored in the PBS 1 is inserted into a trim line range R2 of a trim shop from a conveyer line range R1 with a lifting device DL. An empty pitch controller C1 is provided to determine where to leave an empty pitch P within a line of vehicles. Information on a vehicle that is discharged from the PBS 1 is detected by a first vehicle detection sensor 3, and the vehicle information is supplied to the empty pitch controller C1 through a production instruction server AS.

The empty pitch controller C1 may comprise a processor and associated hardware, as may be selected and programmed to perform the empty pitch leaving method, according to the embodiment of the present invention.

A second vehicle detection sensor 5 is disposed at an entrance of the trim line range R2 (or at an exit of the conveyer line range R1). The second vehicle detection sensor 5 detects vehicle number information of the vehicle that is taken into the trim line range R2 of the trim shop from the conveyer line range R1. The detected vehicle number information is supplied to the empty pitch controller C1 through a painted body storage (PBS) controller C2.

The empty pitch leaving instructions of the empty pitch controller C1 are output to a trim line controller C3. The trim line controller C3 controls vehicle insertion to a trim conveyor with the lifting device DL, and it can leave an empty pitch P within a line of vehicles. A method for leaving an empty pitch according to the embodiment of the present invention leaves an empty pitch within a line of vehicles that are taken into a trim line 9 of the trim shop using the above-stated vehicle conveying system. This improves efficiency of line management of the trim shop and achieves work equalization.

The method for leaving an empty pitch in a vehicle conveyer line according to the embodiment of the present invention, as shown in FIG. 2 at step S100, determines an empty pitch pattern in which an empty pitch P is left in a line of vehicles that are taken into the trim line range R2 of the trim shop from the PBS 1, in conformity with operating and production restriction conditions of the trim shop. The method then initializes related data of the empty pitch pattern for the vehicle entering the conveyer line range R1 and the trim line range R2.

The empty pitch pattern, as shown in FIG. 4, includes at least one pattern. In each pattern, an empty pitch is left in the line of vehicles according to a basic empty pitch leaving pattern such as at the front, rear, front and rear, or at an intermediate section of the line. Preferably, the empty pitch and the sequence of vehicles are expressed as an item number, and a pattern number is endowed to each empty pitch pattern.

A pattern number of an empty pitch pattern for a line of vehicles entering the conveyer line range R1 is expressed as "PNO1", and an individual item number in the empty pitch pattern for the vehicle entering the conveyer line range R1 is expressed as "DNO1". A pattern number of an empty pitch pattern for a line of vehicles entering the trim line range R2 is expressed as "PNO2", and an individual item number in the empty pitch pattern for the vehicle entering the trim line range R2 is expressed as "DNO2". If values of the PNO1 and PNO2 are "0", it means that there is no empty pitch pattern currently applied.

The related data of the empty pitch pattern include pattern numbers PNO1 and PNO2 of the empty pitch pattern for vehicles respectively entering the conveyer line range R1 and trim line range R2, respectively. The individual item numbers DNO1 and DNO2 that are recorded according to a vehicle insertion sequence including an empty pitch in the empty pitch pattern.

After step S100, if a new vehicle is taken into the trim line range R2, vehicle entrance information on vehicles that enter the conveyer line range R1 and the trim line range R2 are renewed. It is then determined whether there is a currently applied empty pitch pattern for the vehicles entering the trim line range R2. At step S200, if it is determined that there is a currently applied empty pitch pattern, the empty pitch controller C1 instructs the trim line controller C3 to leave an empty pitch if an item number is a number of an item number DNO2 for leaving an empty pitch in the corresponding empty pitch pattern PNO2 in the sequence of vehicles, at step S300. Also at step S300, the trim line controller C3 adds "1" to the item number DNO2, and determines that the item number is less than a number of all items of the corresponding empty pitch pattern.

If it is determined that there is no currently applied empty pitch pattern at step S200, a number of a corresponding empty pitch pattern whose vehicle sequence of a corresponding pseudo pattern is equal to the vehicle sequence before entering the trim line range R2 is determined, and a priority order of the determined empty pitch pattern is determined, at step 400. After step S400, the control procedure returns to step S300.

Referring to FIG. 4, the pseudo pattern of the empty pitch pattern means a pattern (i.e., sequence) of vehicles, and it can be obtained by eliminating an empty pitch from the empty pitch pattern.

Hereinafter, the method of leaving an empty pitch according to the present invention will be explained in detail with reference to FIG. 3. At first, at step S11, an empty pitch pattern for leaving an empty pitch within a line of vehicles entering the trim line range R2 of the trim shop from the PBS 1 according to a basic empty pitch leaving scheme is determined in conformity with the operating situation and the production restriction condition of the trim shop as pattern numbers PNO1 and PNO2. The determined empty pitch pattern is then registered in the empty pitch controller C1.

The empty pitch controller C1, at step S12, initializes values of pattern numbers PNO1 and PNO2 of the empty pitch pattern for vehicles entering the conveyer line range R1 and the trim line range R2, and of the individual item numbers DNO1 and DNO2 that are recorded according to an insertion sequence of vehicles and the empty pitch for the empty pitch pattern.

After step S12, the empty pitch controller C1 determines whether a detection signal indicating entrance of a new vehicle from the conveyer line range R1 into the trim line range R2 is input from the second vehicle detection sensor 5 at step S21. If it is determined that the detection signal is not input, the control procedure proceeds to step S35. On the other hand, if it is determined that the detection signal is input, the empty pitch controller C1 renews the vehicle entrance information for vehicles entering the conveyer line range R1 and the trim line range R2 and simultaneously inserts a pattern number PNO2 corresponding to the empty pitch pattern including empty pitches in the line of vehicles according to the basic empty pitch leaving scheme, at step S22.

Then, at step S23, the empty pitch controller C1 determines whether there is a currently applied empty pitch pattern for the vehicles having entered the trim line range R2.

Figure 5:
FIG. 5 is a drawing showing a pattern-applying process according to the method for leaving an empty pitch in the vehicle conveyer line.
Figure 6:
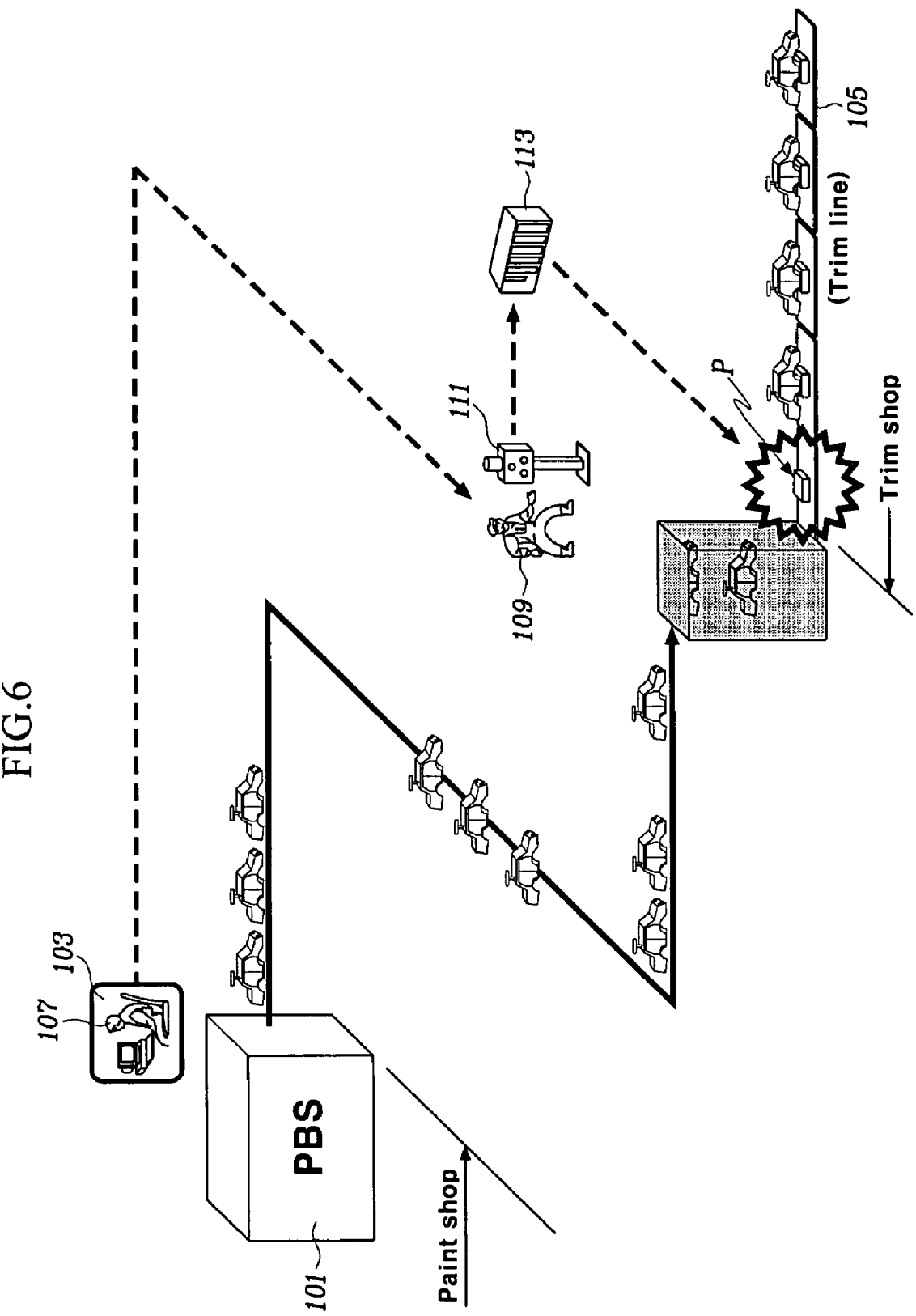
FIG. 6 is a control diagram for a method for leaving an empty pitch in a vehicle conveyer line and a trim line for conveying vehicles from the PBS storing the painted vehicle bodies to a trim shop.

If it is determined that there is a currently applied empty pitch pattern at step S23, i.e., if the value of the PNO2 is not "0", the empty pitch controller C1, as shown in FIG. 5, determines, at step S31, whether the order of the new vehicle entering the trim line range R2 corresponds to an item number DNO2 for leaving an empty pitch of the corresponding empty pitch pattern PNO2. If it is determined that the new vehicle corresponds to the item number DNO2 for leaving the empty pitch P in the empty pitch pattern PNO2, the empty pitch controller C1 outputs an instruction for leaving an empty pitch, to the trim line controller C3 at step S32.

Then, the empty pitch controller C1 adds "1" to the item number DNO2 of the applied empty pitch pattern at step S33, and determines whether a value of the item number is less than a number of all items of the corresponding empty pitch pattern at step S34. If the item number is less than the number of all items of the corresponding empty pitch pattern, the control procedure proceeds to step S35. Otherwise, a reset step S36 is performed and the control procedure returns to step S200. In the reset step S36, the empty pitch pattern number PNO2 and the item number DNO2 are reset.

Meanwhile, if it is determined that there is no currently applied empty pitch pattern at step S23, the empty pitch controller C1 determines whether there is a corresponding empty pitch pattern whose registered pseudo pattern coincides with the sequence of vehicles before entering the trim line range R2 at step S41.

If it is determined that there is no empty pitch pattern whose registered pseudo pattern coincides with the sequence of vehicles before entering the trim line range R2 at step S41, the control procedure proceeds to step S31. On the other hand, if the determination is positive at step S41, the empty pitch controller C1 determines whether a number of the empty pitch pattern whose pseudo pattern coincides with the sequence of vehicles before entering the trim line range R2 is equal to 1 at step S42.

If a number of the empty pitch pattern whose pseudo pattern coincides with the sequence of vehicles before entering the trim line range R2 is 1, the empty pitch controller C1 sets a number of the empty pitch pattern including the new vehicle entering the trim line range R2 as a corresponding pattern number of the empty pitch pattern whose registered pseudo pattern coincides with the sequence of vehicles before entering the trim line range R2, at step S43. On the other hand, if a number of the empty pitch pattern whose registered pseudo pattern coincides with the sequence of vehicles before entering the trim line range R2 is more than 1, the empty pitch controller C1 determines a priority of the empty pitch patterns, as shown in FIG. 5, at step S44. Then, at step S45, the empty pitch controller C1 sets the empty pitch pattern number PNO2 as a pattern number having higher priority.

After steps S43 and S45, the empty pitch controller C1 sets the item number DNO2 of the new vehicle in the corresponding empty pitch pattern as "1". Then, the control procedure returns to step S31.

According to the method for leaving an empty pitch in the vehicle conveyer line according to the embodiment of the present invention, an empty pitch pattern that includes an empty pitch among a line of vehicles according to a basic empty pitch leaving scheme is determined for the vehicle entering the trim shop from the PBS via the vehicle conveyer line. Vehicles are controlled to enter the trim line according to the empty pitch pattern, so that equalization of work in response to operating and manufacture restriction conditions can be achieved and the management efficiency of the trim shop can be improved.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method for leaving an empty pitch in a vehicle conveyor line, comprising:

determining an empty pitch pattern for leaving an empty pitch in a line of vehicles taken into a trim line range of a trim shop from a painted body storage (PBS) via a conveyer line range in conformity with operating and production restriction conditions of the trim shop, and initializing related data of the empty pitch pattern for vehicles entering the conveyer line range and the trim line range;

renewing vehicle entrance information of a vehicle having entered the conveyer line range and the trim line range if a new vehicle is taken into the trim line range, and determining whether there is a currently applied empty pitch pattern for the vehicle having entered the trim line range;

instructing a trim line controller to leave an empty pitch if a sequential number of a vehicle entering the trim line range is equal to an individual item number DNO2 for leaving an empty pitch in the corresponding empty pitch pattern, adding "1" to the individual item number DNO2, and then determining whether a value of the individual item number is greater than a number of total items of the corresponding empty pitch pattern; and determining a number of an empty pitch pattern whose vehicle sequence of a corresponding pseudo pattern is equal to a vehicle sequence of vehicles before entering the trim line range, determining a priority order of the determined empty pitch pattern, and then returning to instructing a trim line controller.

2. The method of claim 1, wherein the empty pitch pattern comprises an empty pitch left in a line of vehicles according to a basic empty pitch leaving scheme comprising leaving front, rear, front and rear, or intermediate pitches empty, and wherein a sequence of the empty pitch and the vehicle is described as an item number.

3. The method of claim 1, wherein related data of the empty pitch pattern comprise a pattern number of an empty pitch pattern for vehicles respectively entering the conveyer line range and the trim line range, and an individual item number that is recorded according to a vehicle insertion sequence including an empty pitch.

4. The method of claim 1, wherein the pseudo pattern is obtained by eliminating an empty pitch from the empty pitch pattern.

5. The method of claim 1, wherein the determining an empty pitch pattern and initializing related data comprise:

determining an empty pitch pattern for leaving an empty pitch within a line of vehicles entering the trim line range of the trim shop from the PBS according to a basic empty pitch leaving scheme in conformity with the operating and production restriction conditions of the trim shop as pattern numbers, and registering the determined empty pitch pattern; and initializing a value of a pattern number of the empty pitch pattern for vehicles entering the conveyer line range and the trim line range and a value of the individual item number that are recorded according to an insertion sequence of vehicles and the empty pitch.

6. The method of claim 1, wherein the renewing and the determining comprise:

determining whether a detection signal indicating entrance of a new vehicle from the conveyer line range to the trim line range is input from a vehicle detection sensor;

proceeding to an ending step if it is determined that the detection signal is not input, and renewing vehicle entrance information for vehicles entering the conveyer line range and the trim line range if it is determined that the detection signal is input and simultaneously inserts a pattern number corresponding to the empty pitch pattern including empty pitches in a line of vehicles according to the basic empty pitch leaving scheme; and determining whether there is a currently applied empty pitch pattern for the vehicles having entered the trim line range.

7. The method of claim 1, further comprising:

determining whether an order of a new vehicle entering the trim line range corresponds to an item number DNO2 for leaving an empty pitch in the corresponding empty pitch pattern PNO2, if it is determined that there is a currently applied empty pitch pattern;

outputting an instruction for leaving an empty pitch to a trim line controller, if it is determined that the order of the new vehicle corresponds to the item number DNO2 for leaving the empty pitch in the empty pitch pattern PNO2;

adding "1" to the item number DNO2 of the applied empty pitch pattern, and determining whether a value of the item number is less than a number of all items of the corresponding empty pitch pattern; and proceeding to an ending step if the item number is less than the number of all items of the corresponding empty pitch pattern, and returning to the renewing and the determining after performing resetting if the item number is not less than the number of all items of the corresponding empty pitch pattern.

8. The method of claim 7, wherein the resetting comprises resetting a pattern number of the empty pitch pattern for vehicles entering the trim line range and the item number in the empty pitch pattern for vehicles entering the trim line range.

9. The method of claim 1, further comprising:

determining whether there is a corresponding empty pitch pattern whose registered pseudo pattern coincides with a sequence of vehicles before entering the trim line range, if it is determined that there is no currently applied empty pitch pattern;

determining whether a number of the empty pitch pattern whose pseudo pattern coincides with the sequence of vehicles before entering the trim line range;

setting the empty pitch leaving number of the empty pitch pattern including the new vehicle entering the trim line range as a corresponding pattern number of the empty pitch pattern whose registered pseudo pattern coincides with the sequence of vehicles before entering the trim line range, if the number of the empty pitch pattern whose pseudo pattern coincides with the sequence of vehicles before entering the trim line range;

determining a priority of the corresponding empty pitch patterns if the number of the empty pitch pattern whose registered pseudo pattern coincides with the sequence of vehicles before entering the trim line range is more than 1;

setting the empty pitch pattern number PNO2 as a pattern number having a higher priority; and setting the item number DNO2 of the new vehicle in the corresponding empty pitch pattern as "1", and returning to the instructing a trim line controller to leave an empty pitch.

10. A method for leaving an empty pitch in a vehicle conveyer line, comprising:

determining an empty pitch pattern for leaving an empty pitch in a line of vehicles entering a trim line range of a trim shop from a painted body storage (PBS) according to a basic empty pitch leaving scheme in conformity with an operating situation and a production restriction condition of the trim shop as pattern numbers, and registering the determined empty pitch pattern;

initializing a value of a pattern number of the empty pitch leaving pattern for vehicles entering the conveyer line range and the trim line range and a value of the individual item number that are recorded according to an insertion sequence of vehicles and the leaving of the empty pitch;

determining whether a detection signal indicating entrance of a new vehicle from the conveyer line range to the trim line range is input from a vehicle detection sensor;

proceeding to an ending step if it is determined that the detection signal is not input, and renewing vehicle entrance information for vehicles entering the conveyer line range and the trim line range if it is determined that the detection signal is input and simultaneously chasing a pattern number corresponding to the empty pitch pattern including empty pitches in a line of vehicles according to the basic empty pitch leaving scheme;

determining whether there is a currently applied empty pitch pattern for the vehicles having entered the trim line range;

determining whether an order of a new vehicle entering the trim line range corresponds to an item number DNO2 for leaving an empty pitch in the corresponding empty pitch pattern PNO2, if it is determined that there is a currently applied empty pitch pattern;

outputting an instruction for leaving an empty pitch to a trim line controller, if it is determined that the order of the new vehicle corresponds to the item number DNO2 for leaving the empty pitch in the empty pitch pattern PNO2;

adding "1" to the item number DNO2 of the applied empty pitch pattern, and determining whether a value of the item number is less than a number of all items of the corresponding empty pitch pattern;

proceeding to the ending step if the item number is less than the number of all items of the corresponding empty pitch pattern, and returning to the renewing and the determining after performing resetting if the item number is not less than the number of all items of the corresponding empty pitch pattern;

determining whether there is a corresponding empty pitch pattern whose registered pseudo pattern coincides with a sequence of vehicles before entering the trim line range, if it is determined that there is no currently applied empty pitch pattern;

determining whether a number of the empty pitch pattern whose pseudo pattern coincides with the sequence of vehicles before entering the trim line range;

setting the empty pitch leaving number of the empty pitch pattern including the new vehicle entering the trim line range as a corresponding pattern number of the empty pitch pattern whose registered pseudo pattern coincides with the sequence of vehicles before entering the trim line range, if the number of the empty pitch pattern whose pseudo pattern coincides with the sequence of vehicles before entering the trim line range;

determining a priority of the corresponding empty pitch patterns, if the number of the empty pitch pattern whose registered pseudo pattern coincides with the sequence of vehicles before entering the trim line range is more than 1;

setting the empty pitch pattern number PNO2 as a pattern number having a higher priority; and setting the item number DNO2 of the new vehicle in the corresponding empty pitch pattern as '1', and returning to the instructing a trim line controller to leave an empty pitch.

* * * * *